United States Patent
Nerone

(10) Patent No.: US 7,905,686 B2
(45) Date of Patent: Mar. 15, 2011

(54) SYSTEM FOR REMOVING BOILER TUBE STUBS

(75) Inventor: Stephen Nerone, Seekonk, MA (US)

(73) Assignee: Esco Technologies, Inc., Holliston, MA (US)

( * ) Notice: Subject to any disclaimer, the term of this patent is extended or adjusted under 35 U.S.C. 154(b) by 170 days.

(21) Appl. No.: 12/215,951

(22) Filed: Jul. 1, 2008

(65) Prior Publication Data

US 2009/0022563 A1   Jan. 22, 2009

Related U.S. Application Data

(60) Provisional application No. 60/958,017, filed on Jul. 2, 2007.

(51) Int. Cl.
*B26D 7/00* (2006.01)
*B26D 1/00* (2006.01)

(52) U.S. Cl. .......................... 407/30; 407/33

(58) Field of Classification Search .............. 407/33–35, 407/113–116; 409/234; 82/46
See application file for complete search history.

(56) References Cited

U.S. PATENT DOCUMENTS

| | | | | |
|---|---|---|---|---|
| 1,458,802 | A | * | 6/1923 | Bufford ......................... 407/90 |
| 3,087,230 | A | * | 4/1963 | Comire ......................... 407/108 |
| 4,545,441 | A | * | 10/1985 | Williamson ................... 175/431 |
| 4,723,877 | A | * | 2/1988 | Erickson ....................... 409/234 |
| 5,356,248 | A | * | 10/1994 | Hillestad ....................... 409/132 |
| 5,496,137 | A | * | 3/1996 | Ochayon et al. ............... 408/226 |
| 5,733,073 | A | * | 3/1998 | Zitzlaff et al. ................. 407/107 |
| 5,974,642 | A | | 11/1999 | Weeks |
| 6,273,650 | B1 | * | 8/2001 | Jordberg ....................... 407/102 |
| 6,871,859 | B2 | * | 3/2005 | Lundblad et al. ............. 279/102 |
| 6,932,548 | B2 | * | 8/2005 | Obrachta ....................... 409/234 |
| 6,955,507 | B2 | * | 10/2005 | Hall ............................... 407/33 |
| 7,093,360 | B1 | | 8/2006 | Craig |
| 7,390,149 | B2 | * | 6/2008 | Wihlborg ....................... 407/35 |
| 2007/0122246 | A1 | * | 5/2007 | Moruzzi ......................... 409/64 |
| 2009/0022563 | A1 | * | 1/2009 | Nerone ......................... 409/234 |

* cited by examiner

*Primary Examiner* — Will Fridie, Jr.
(74) *Attorney, Agent, or Firm* — Paul C. Remus; Raymond I. Bruttomesso, Jr.

(57) ABSTRACT

A rotary milling head for boiler tube stub removal with cylindrical cutting pieces removably secured to the milling head by forces exerted by the material being cut and by friction, without any separate securing element.

15 Claims, 4 Drawing Sheets

SYSTEM FOR REMOVING BOILER TUBE STUBS

The present application claims the benefit of provisional patent application Ser. No. 60/958,017 filed Jul. 2, 2007, which is incorporated herein by reference.

TECHNICAL FIELD

The present invention relates to a system for removing boiler tube stubs. More specifically, it relates to the use of a rotary milling head to remove the boiler tube stubs quickly and economically without damaging the boiler drum.

BACKGROUND OF THE INVENTION

Commercial boilers generally have multiple drums or heads (collectively, "drums") interconnected with numerous steel boiler tubes in the range of 1-5 inches in diameter. As shown in FIG. 1, an end 8 of a boiler tube 9 is inserted through an opening 10 in a boiler drum 11 (represented here by a section of boiler drum) so that the end 8 extends into the boiler drum 11. The boiler tube 9 is expanded against the circumference 12 of the opening, and the end 8 is flared 14 against the drum 11 on the inner periphery of the opening 10.

Boiler tubes are routinely replaced for repair or maintenance. Boiler tube removal has been achieved in the prior art by cutting the tube close to the exterior periphery of the drum opening and then notching the remaining boiler tube stub with a torch and mechanically forcing the stub out of the opening in the drum into the drum. This often leads to damage to the opening in the drum.

Other techniques in the prior art for removing boiler tube stubs include using a special tool to slit the stub through its entire length, as described in U.S. Pat. No. 5,974,642. This technique requires expensive special purpose cutting tools.

Still another technique, as described in U.S. Pat. No. 7,093,360, involves a piloted rotary cutting tool that is inserted in the stub and used to remove all but a thin shell of the stub. The remaining thin shell of the stub is then manually pushed away from the periphery of the opening in the drum. This technique involves a cutting tool that is expensive to replace and to sharpen. Moreover, it does not provide for removal of the flared portion of the stub.

SUMMARY

The present invention is a milling head to remove boiler tube stubs. It includes cutting pieces with circular cutting faces that are inserted in holes in the milling head and are removably secured therein by forces exerted on the cutting pieces by the material being cut and by friction without any separate means for securing the cutting pieces to the milling head.

BRIEF DESCRIPTION OF THE DRAWINGS

These and other features and advantages of the present invention will be better understood by reading the following detailed description, taken together with the drawings wherein.

DETAILED DESCRIPTION OF PREFERRED EMBODIMENTS

Figure 2:
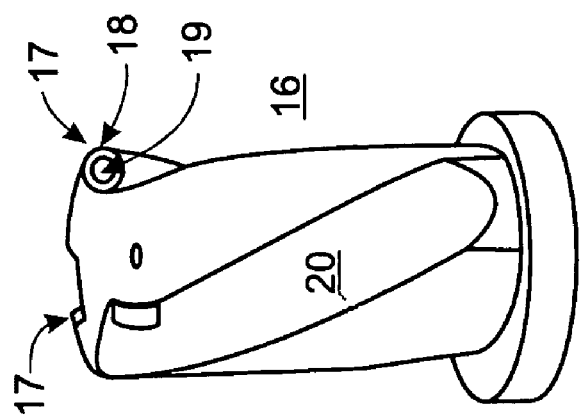
FIG. 2 is a diagram of a preferred embodiment of the rotary milling head of the present invention.
Figure 1:
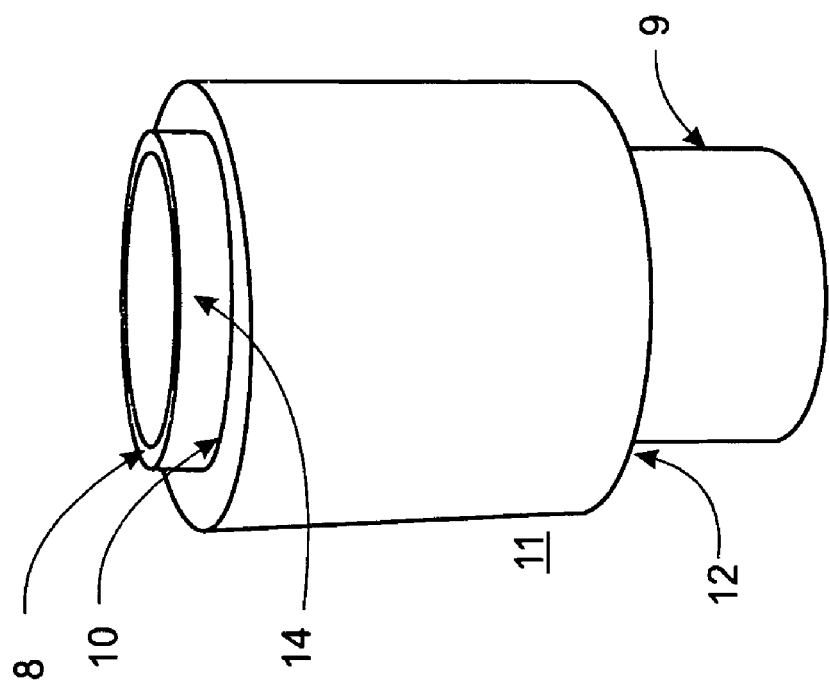
FIG. 1 is a diagram of a boiler tube stub in an opening in a section of boiler drum.

A preferred embodiment of the rotary milling head of the present invention is shown in FIG. 2. The rotary milling head 16 has a cutting diameter slightly smaller than the diameter of a boiler drum opening. The rotary milling head 16 has cutting pieces 17 comprising cylindrical cutting blades 18 with concave faces 19. Other embodiments (not shown) have other cutting blades of other shapes known to those skilled in the art. The rotary milling head 16 also has chip gullets 20 for removal of material cut from the inner diameter of a boiler tube stub.

Figure 3:
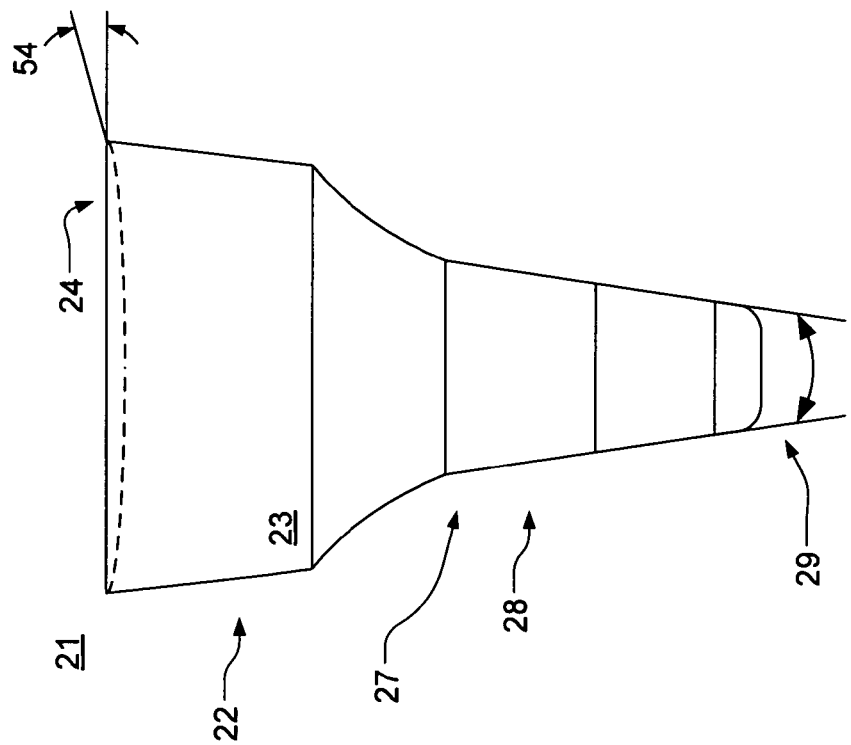
FIG. 3 is a diagram of a cutting piece for the preferred embodiment of the rotary milling head of the present invention shown in FIG. 2.

Referring to FIG. 3, another preferred embodiment has a cutting piece 21 that comprises a cutting blade in the shape of a truncated conical section 22 with a concave circular face 24. The other end of the cutting blade 23 is attached to the larger end 27 of a truncated conical section comprising a cutting piece body 28 with a truncated end 29. The cutting piece 21 is made of tungsten carbide or high-speed steel. The cutting piece 21 is commercially available and is marketed for mounting in a stationary position as opposed to the position on the rotating milling head of the present invention.

Figure 4:
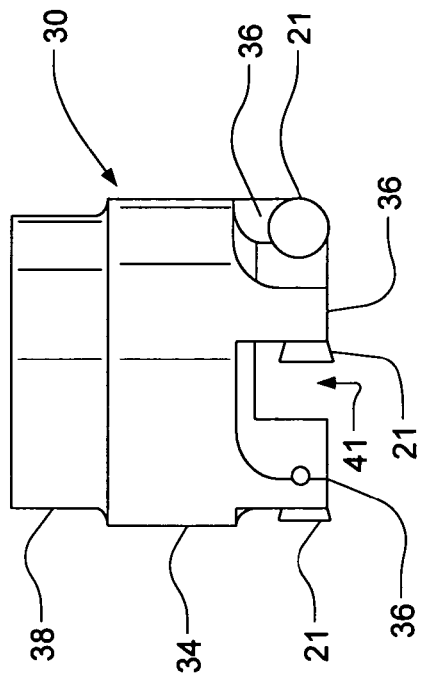
FIG. 4 is a side view diagram of a preferred embodiment of the rotary milling head of the present invention.
Figure 5:
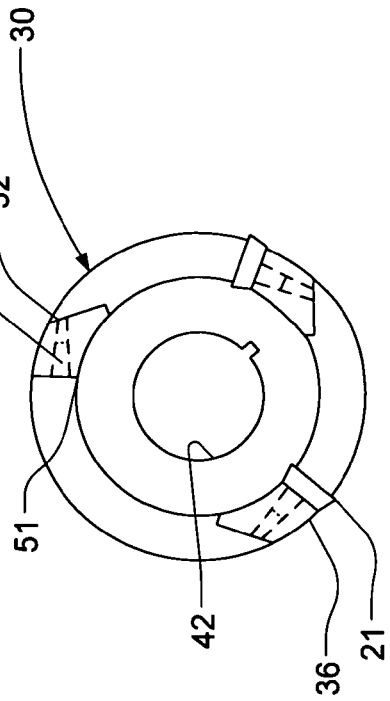
FIG. 5 is a top view diagram of the preferred embodiment of the rotary milling head of the present invention shown in FIG. 4.

Also, FIGS. 4 and 5 show yet another preferred embodiment of the rotary milling head 30 of the present invention. The rotary milling head 30 has a plurality of axially extending radial cutting piece supports 36 at one end 41 and a tool mounting portion 38 at the other end with body 34 between them. The mounting portion 38 has a cylindrical bore 42 for removably receiving rotary gearing of a rotary milling tool. Various means for mounting the milling head 30 known to the art can be utilized.

The rotary milling head 30 has a plurality of axially extending radial cutting piece supports 36. Each of the cutting piece supports has a face, sides and a back with a hole 50 in its face 51 with walls. The hole is approximately the same size and shape as the truncated conical section 28 of the cutting piece 21. The hole 50 is extended through the back 52 (or through the side depending on the precise configuration) of the cutting piece support 36, the extension of the hole being preferably in the shape of a cylinder of a diameter of approximately the same size as, or slightly smaller than, the diameter of the truncated end 29 of the cutting piece 21.

The truncated conical section 28 of a cutting piece 21 is inserted in a hole 50. The cutting piece 21 is removably secured to the cutting piece support 36 by the force exerted by the material being removed from the boiler tube stub against the cutting piece 21 and by friction between the truncated conical section 28 of the cutting piece 21 and the walls of the hole 50 in the cutting blade support 36. If a cutting blade 22 breaks off a cutting piece 21, the portion of the cutting piece remaining in the hole 50 in the cutting piece support 36 can be removed by inserting a tool (not shown) into the extension of the hole through the back 52 of the cutting support 36 and simply pushing the remaining portion of the cutting piece 21 out of the hole. Moreover, if one or more of cutting blades 22 becomes dull, they can easily and economically be replaced rather than sharpening the entire rotary milling head.

Figure 6:
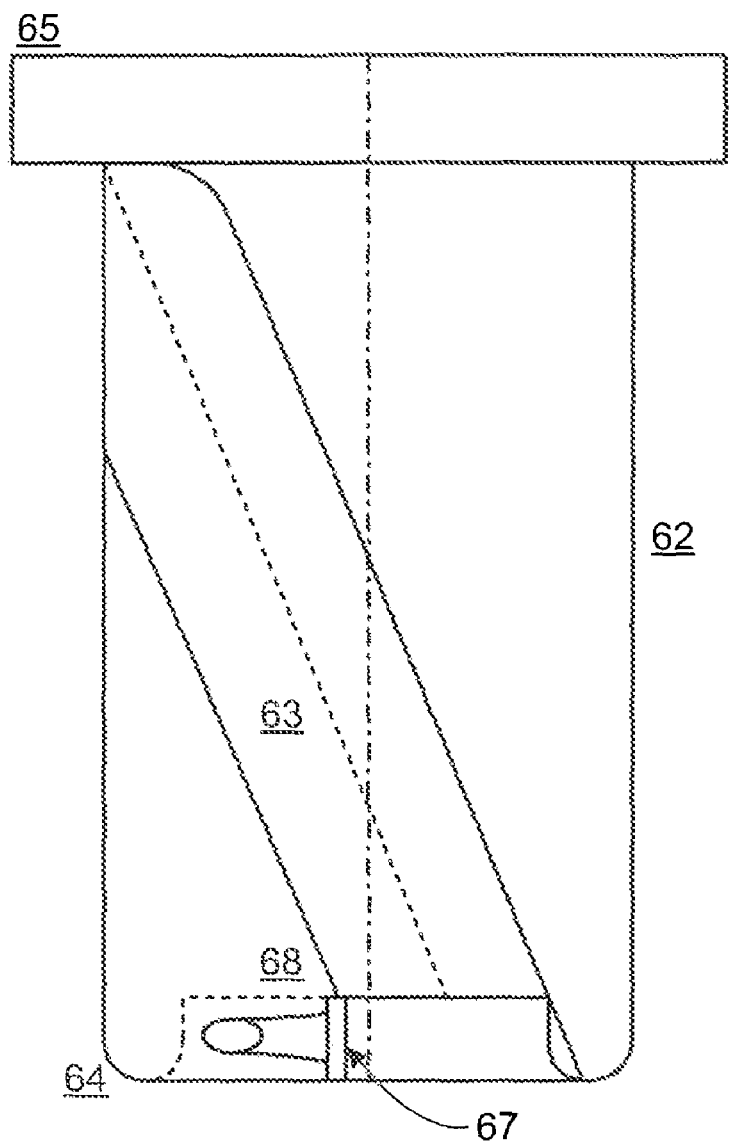
FIG. 6 is a schematic diagram of a preferred embodiment of the rotary milling head of the present invention.

Another preferred embodiment of the rotary milling head 62 of the present invention is shown in FIG. 6. This embodiment has a chip gullet 63 for removal of material cut from the inner diameter of a boiler tube stub. The chip gullet 63 is one of three gullets placed 120° apart and rotating 90° from the first end 64 of the rotary milling head 62 to the second end 65. The gullet 63 starts 30° ahead of the cutting face 67 of a cutting piece 68.

Figure 7:
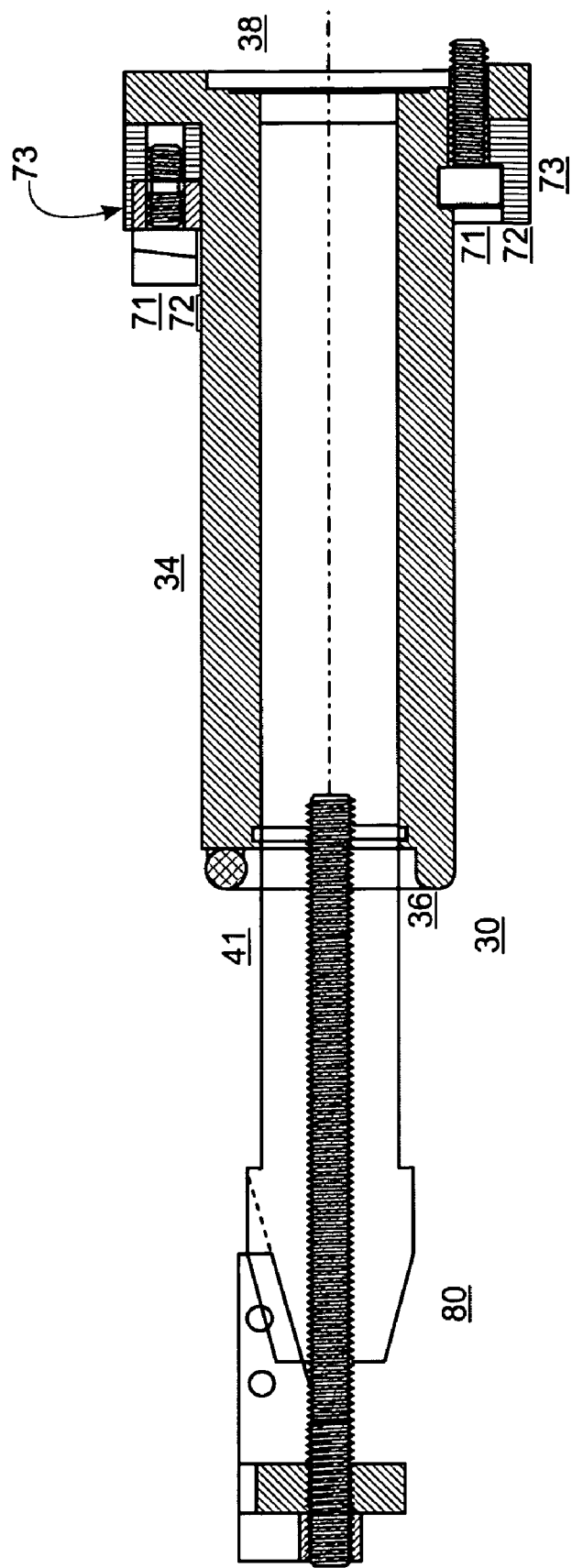
FIG. 7 is a side view diagram of a preferred embodiment of the rotary milling head of the present invention that includes a mandrel.

Another preferred embodiment of the rotary milling head of the present invention also includes flare cutting heads 71 as shown in FIG. 7. The flare cutting heads 71 are mounted on the rotary milling head 30 between the end 41 with the cutting piece supports 36 and end with the tool mounting portion 38. The flare cutting heads 71, which may be cutting pieces 21 as used for the boiler tube stub removal, as described above, or other shape known to those skilled in the art. The flare cutting pieces 71 shown in FIG. 7 are generally rectangular shaped and have one cutting edge 72 generally perpendicular to the rotational axis of the rotary milling head 30 and one cutting edge 73 generally parallel to the rotational axis of the rotary milling head 30. The flare cutting heads 71 remove the boiler tube stub flare at the same time the cutting pieces 21 are removing material from the inner diameter of the boiler tube stub. In addition, this preferred embodiment uses a mandrel 80 for insertion into the boiler tube stub to locate the rotary milling head on the correct longitudinal axis in the boiler tube stub end and to provide a mechanism to advance both the cutting pieces 21 and the flare cutting heads 71.

Referring to the drawings, in use the rotary milling head 30 of the present invention is centered on the longitudinal axis of a boiler tube stub (preferably at the flared end 14). The mandrel 80 is inserted into the boiler tube stub to locate the rotary milling head 30 on the correct longitudinal axis and to provide a means for advancing the cutting pieces 21 into the boiler tube stub. As the rotary milling head advances, the cutting pieces 21 remove material from the inner diameter of the tube stub, leaving only a thin shell of material. The flare cutting heads 71 also remove material from the flared tube end 14. When the tube cutting pieces 21 have advanced sufficiently through the boiler tube stub and the flare cutting heads 71 have removed enough of the flared tube end 14, the mandrel 80 is released and the rotary milling head 30 is withdrawn from the boiler tube stub. The remaining thin shell of the tube stub can then be manually pulled away from the drum opening 10 and removed.

The system of this invention is simple and inexpensive and allows quick and easy removal of boiler tube stubs without damaging or distorting the openings in the boiler drum.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A rotary milling head for removing boiler tube stubs comprising;
   a rotary milling head body with a first end, and a second end adapted to be connected to a means of rotation;
   a plurality of axially extending cutting piece supports attached to the first end of the rotary milling head body, each cutting piece support having a face, sides and a back, each cutting piece support further having a hole in its face with walls, said walls forming a hole with first the shape of a truncated conical section with a large end and a small end, the large end being closer to the face, and then a generally cylindrical shape extending through a side or the back of the cutting piece support;
   a plurality of cutting pieces, each cutting piece comprising a cutting blade with a first side being the cutting face and a second side attached to a cutting piece body in the shape of a truncated conical section of approximately the same size and shape as a hole in a cutting piece support, such that when the cutting piece body is inserted in the hole, the cutting piece is removably secured in the hole by forces exerted on it by material being cut and friction between the cutting piece body and the walls of the hole without any other securing means; and
   a mandrel to locate the rotary milling head on the correct longitudinal axis and to provide a means to advance the cutting blades.

2. The rotary milling head of claim 1 further comprising a plurality of chip gullets.

3. The rotary milling head of claim 1 wherein the second side of the head is adapted to be connected to a means of rotation by having a cylindrical bore for removably receiving rotary gearing of a rotary milling tool.

4. The rotary milling head of claim 1 wherein the cutting blade is a truncated conical section.

5. The rotary milling head of claim 1 wherein the cutting blade is cylindrical.

6. The rotary milling head of claim 5 wherein the face of the cutting blade is circular.

7. The rotary milling head of claim 6 wherein the face of the cutting blade is concave.

8. The rotary milling head of claim 1 further comprising a plurality of flare cutting heads.

9. A rotary milling head for removing boiler tube stubs comprising;
   a milling head body with a first side and a second side adapted to be connected to a means of rotation;
   an axially extending cutting piece support attached to the first side of the milling head body, the cutting piece support having a plurality of tapered holes therein; and
   a plurality of cutting pieces, each cutting piece removably securable in one of the tapered holes in the cutting piece support without any separate securing element by friction between the cutting piece and the walls of the hole without any other securing mean.

10. A rotary milling head for preparing a tube end comprising;
    a milling head body with a first side and a second side adapted to be connected to a means of rotation;
    an axially extending cutting piece supports attached to the first side of the milling head body, the cutting piece support having at least one tapered hole therein;
    a cutting piece, the cutting piece inserted in the tapered hole in the cutting piece support; and
    means for removably securing the cutting piece in the hole in the cutting piece support without any separate securing element by friction between the cutting piece and the walls of the hole without any other securing means.

11. A rotary milling head of claim 9 further comprising a plurality of chip gullets.

12. A rotary milling head of claim 9 wherein the cutting blade is a truncated conical section.

13. A rotary milling head of claim 9 wherein the cutting blade is cylindrical.

14. A rotary milling head of claim 13 wherein the face of the cutting blade is circular.

15. A rotary milling head of claim 14 wherein the face of the cutting blade is concave.

* * * * *